UNITED STATES PATENT OFFICE.

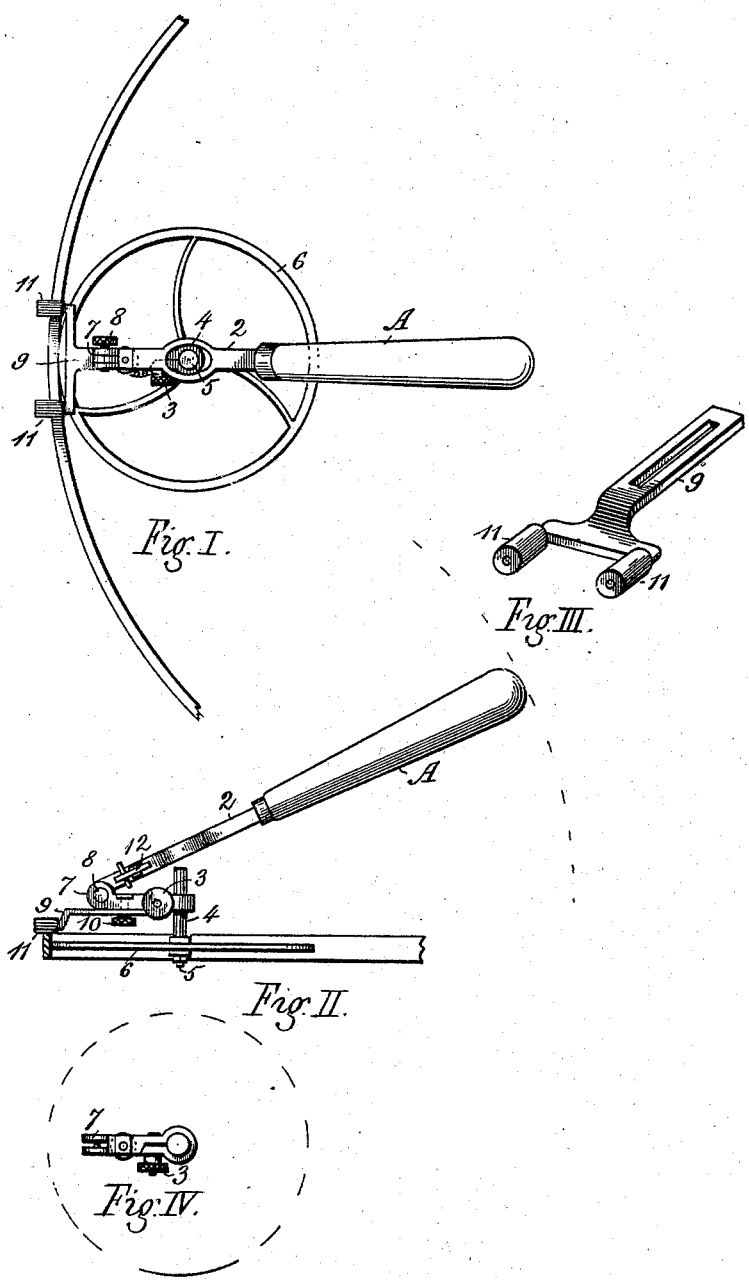

AUGUST EDWARD REMUS, OF OAK PARK, ILLINOIS, ASSIGNOR OF ONE-THIRD TO C. J. GOTSCH, OF SAME PLACE.

WHEEL-MEASURE.

SPECIFICATION forming part of Letters Patent No. 571,313, dated November 10, 1896.

Application filed June 24, 1896. Serial No. 596,801. (No model.)

*To all whom it may concern:*

Be it known that I, AUGUST EDWARD REMUS, a citizen of the United States, residing at Oak Park, in the county of Cook and State of Illinois, have invented a new and useful Improvement in Measuring-Wheels, which improvement is fully set forth in the following specification and accompanying drawings, in which—

Figure I is a top or plan view of my improved measuring-wheel; Fig. II, a side view showing the operation of the device, and Figs. III and IV detail views.

My invention relates to improvements in measuring-wheels of the class generally used for finding the proper length of tires for wagon-wheels; and my object is to provide a simple, novel, and useful device whereby the circumference of the wheels and the required length of tires for the same may be ascertained with ease and accuracy.

The essential feature of the invention consists in forming an adjustable hinged joint in the shank of the tool to enable the operator to measure a tire while lying on the floor instead of lifting and placing it on trestles or other supports in the usual manner. I also provide means for keeping the wheel moving in a direct line while in operation, thus insuring correct measurement.

The peculiar construction and utility of the device will be readily understood by referring to the accompanying drawings, in which—

A indicates the handle, which is mounted on the shank 2, the outer end of which is reduced in thickness and bent back upon itself, and, being provided with a binding-screw 3, forms an adjustable clamp for the sleeve 4, which serves as an axle-box for the spindle 5, upon which the measuring-wheel 6 is adjustably mounted. The said wheel may be provided on its outer border with a scale of inches and fractions, and, if desired, with an adjustable index near its center to show the number of revolutions during the measuring process. The shank has a hinge-joint 7, and the handle may thereby be adjusted and fixed at any desired angle by a tightening-screw 8. It will be observed that by this arrangement the forward end of the shank may be turned backwardly under the rear section thereof, (see Fig. II,) and the handle being thus elevated the length of the tire may be easily and conveniently measured on the inner or outer side while lying on the ground. In order to secure accuracy of measurement, it is necessary to prevent a serpentine movement of the wheel while in operation. This is effected by a slotted slide 9, which is adjustably attached to the under side of the shank by a thumb-screw 10, and has a bifurcated inner end provided with guide-rollers 11, which engage the upper edge of the tire, as shown in Figs. II and III. It is obvious that if the rollers be kept in contact with the tire the wheel will necessarily run in a direct line and consequently show the correct measurement. The shank is also provided with a spring 12, adapted to hold a pencil or chalk to indicate the starting-point of the measuring-wheel on the tire.

What I claim as new is—

In a device for measuring vehicle-tires, the combination with a measuring-wheel of the herein-described jointed shank, and the adjustable slide provided with guide-rollers substantially as and for the purpose herein set forth.

In testimony that I claim the foregoing I have hereunto set my hand, this 12th day of May, 1896, in the presence of witnesses.

AUGUST EDWARD REMUS.

Witnesses:
FREDERICK BLESSMAN,
ALBERT J. WITT.